(12) United States Patent
Kaethler et al.

(10) Patent No.: US 10,905,962 B2
(45) Date of Patent: Feb. 2, 2021

(54) MACHINE-LEARNED TRUST SCORING FOR PLAYER MATCHMAKING

(71) Applicant: Valve Corporation, Bellevue, WA (US)

(72) Inventors: Richard Kaethler, Redmond, WA (US); Anthony John Cox, Seattle, WA (US); Brian R. Levinthal, Redmond, WA (US); John McDonald, Seattle, WA (US)

(73) Assignee: Valve Corporation, Bellevue, WA (US)

( * ) Notice: Subject to any disclaimer, the term of this patent is extended or adjusted under 35 U.S.C. 154(b) by 0 days.

(21) Appl. No.: 16/125,224

(22) Filed: Sep. 7, 2018

(65) Prior Publication Data
US 2020/0078688 A1    Mar. 12, 2020

(51) Int. Cl.
*A63F 13/798* (2014.01)
*A63F 13/795* (2014.01)
*G06N 3/08* (2006.01)
*A63F 13/75* (2014.01)
*A63F 13/335* (2014.01)
*G06N 20/00* (2019.01)

(52) U.S. Cl.
CPC .......... *A63F 13/798* (2014.09); *A63F 13/335* (2014.09); *A63F 13/75* (2014.09); *A63F 13/795* (2014.09); *G06N 3/08* (2013.01); *G06N 20/00* (2019.01); *A63F 2300/5566* (2013.01)

(58) Field of Classification Search
None
See application file for complete search history.

(56) References Cited

U.S. PATENT DOCUMENTS

| 7,169,050 | B1 | 1/2007 | Tyler | |
| 8,221,238 | B1* | 7/2012 | Shaw | A63F 13/79 463/29 |
| 8,984,151 | B1* | 3/2015 | Hsieh | H04L 63/10 709/203 |
| 9,180,362 | B2* | 11/2015 | Herrman | G06Q 30/02 |

(Continued)

OTHER PUBLICATIONS

The PCT Search Report and Written Opinion dated Nov. 15, 2019 for PCT application No. PCT/US19/50045>, 13 pages.

(Continued)

*Primary Examiner* — Seng H Lim
(74) *Attorney, Agent, or Firm* — Lee & Hayes, P.C.

(57) ABSTRACT

A trained machine learning model(s) is used to determine scores (e.g., trust scores) for user accounts registered with a video game service, and the scores are used to match players together in multiplayer video game settings. In an example process, a computing system may access data associated with registered user accounts, provide the data as input to the trained machine learning model(s), and the trained machine learning model(s) generates the scores as output, which relate to probabilities of players behaving, or not behaving, in accordance with a particular behavior while playing a video game in multiplayer mode. Thereafter, subsets of logged-in user accounts executing a video game can be assigned to different matches based at least in part on the scores determined for those logged-in user accounts, and the video game is executed in the assigned match for each logged-in user account.

20 Claims, 5 Drawing Sheets

(56) References Cited

U.S. PATENT DOCUMENTS

| | | | |
|---|---|---|---|
| 9,246,923 B1* | 1/2016 | Terribilini | H04L 63/101 |
| 9,694,286 B2* | 7/2017 | Khabazian | A63F 13/75 |
| 10,207,189 B1 | 2/2019 | Gauffin et al. | |
| 10,357,713 B1* | 7/2019 | Landers | A63F 13/40 |
| 2002/0187828 A1 | 12/2002 | Benbrahim | |
| 2004/0097287 A1* | 5/2004 | Postrel | G07F 17/32 |
| | | | 463/41 |
| 2006/0121990 A1* | 6/2006 | O'Kelley, II | A63F 13/795 |
| | | | 463/42 |
| 2006/0247055 A1* | 11/2006 | O'Kelley, II | A63F 13/12 |
| | | | 463/42 |
| 2006/0287096 A1* | 12/2006 | O'Kelley, II | A63F 13/12 |
| | | | 463/42 |
| 2007/0105624 A1 | 5/2007 | Tyler | |
| 2009/0325709 A1* | 12/2009 | Shi | G06Q 10/101 |
| | | | 463/42 |
| 2010/0323794 A1 | 12/2010 | Su | |
| 2011/0105221 A1* | 5/2011 | Sotoike | A63F 13/35 |
| | | | 463/29 |
| 2011/0320823 A1 | 12/2011 | Saroiu et al. | |
| 2012/0142429 A1* | 6/2012 | Muller | A63F 13/45 |
| | | | 463/42 |
| 2012/0236103 A1* | 9/2012 | Cahill | G06Q 10/101 |
| | | | 348/14.01 |
| 2013/0090750 A1* | 4/2013 | Herrman | G06Q 30/02 |
| | | | 700/92 |
| 2013/0123003 A1* | 5/2013 | Williams | A63F 13/10 |
| | | | 463/29 |
| 2013/0227700 A1 | 8/2013 | Dhillon et al. | |
| 2013/0296039 A1* | 11/2013 | Engineer | A63F 13/12 |
| | | | 463/29 |
| 2014/0025732 A1* | 1/2014 | Lin | H04L 67/306 |
| | | | 709/204 |
| 2014/0280095 A1 | 9/2014 | Friedman et al. | |
| 2015/0238866 A1* | 8/2015 | Khabazian | A63F 13/75 |
| | | | 463/7 |
| 2015/0339583 A1* | 11/2015 | McQueen | H04L 51/12 |
| | | | 706/12 |
| 2016/0001181 A1* | 1/2016 | Marr | A63F 13/30 |
| | | | 463/42 |
| 2016/0005270 A1 | 1/2016 | Marr et al. | |
| 2016/0170969 A1* | 6/2016 | Allen | G06F 40/40 |
| | | | 704/9 |
| 2017/0193845 A1 | 7/2017 | Cardonha et al. | |
| 2017/0225079 A1 | 8/2017 | Conti et al. | |
| 2017/0236370 A1* | 8/2017 | Wang | G07F 17/3218 |
| | | | 463/25 |
| 2017/0259178 A1* | 9/2017 | Aghdaie | A63F 13/73 |
| 2017/0294075 A1* | 10/2017 | Frenkel | G07F 17/32 |
| 2018/0068108 A1 | 3/2018 | Fish et al. | |
| 2018/0111051 A1* | 4/2018 | Xue | A63F 13/795 |
| 2018/0182208 A1* | 6/2018 | Liu | G07F 17/3241 |
| 2018/0359302 A1* | 12/2018 | Gong | G06F 16/176 |
| 2019/0095600 A1* | 3/2019 | Chan | G06F 21/32 |
| 2019/0095601 A1* | 3/2019 | Chan | G06K 9/00261 |
| 2020/0061472 A1 | 2/2020 | Jacoby et al. | |
| 2020/0184084 A1 | 6/2020 | Shockley et al. | |

OTHER PUBLICATIONS

Office Action for U.S. Appl. No. 16/663,041, dated Sep. 29, 2020, Bleasdale-Sheperd, "Machine-Learned Trust Scoring Based on Sensor Data", 11 Pages.

PCT Search Report and Written Opinion dated Nov. 16, 2020 for PCT application No. PCT/US20/56920, 10 pages.

* cited by examiner

MACHINE-LEARNED TRUST SCORING FOR PLAYER MATCHMAKING

BACKGROUND

The constant, or nearly constant, availability of wide area network communications, in combination with increasing capabilities of client machines, has caused a rise in popularity of online multiplayer video games. In these multiplayer video games, a video game service may use a matchmaking system to match players together in groups so that grouped players can play the video game together in multiplayer mode. One popular video game genre where players often play in multiplayer mode is the first-person shooter genre. In this example genre, two or more teams of players can compete in multiple rounds with the goal of winning enough rounds to win a match. Players on the same team may work together to accomplish an objective, while competing against players of an opposing team.

Although the vast majority of video game players do not engage in cheating behavior, there is often a small population of players who cheat in order to gain an advantage over other players. Often, cheating players employ third party software that provides them with some informational or mechanical advantage over other players. For example, third party software may be configured to extract location data about the locations of other players and may present these locations to the cheating player. This informational advantage allows the cheating player to ambush the other players, or otherwise exploit the location information revealed by third party software. A more conspicuous manner of cheating is to use third party software that is able to detect where another player's location and automate the motions of the cheater's avatar (e.g., by programmatically moving a mouse cursor to the targeted player and firing a weapon in an automated fashion). In other words, some players cheat by having third party software play the video game on their behalf, using computerized algorithms that enhance the cheating player's performance from a mechanical perspective.

In general, bad player behavior, such as cheating, ruins the gameplay experience for players who want to play the game legitimately. Thus, if a player who intends to engage in bad behavior is matched with other players who exhibit good behavior, the multiplayer video game experience is ruined for the good-behaving players. Systems in use today that attempt to identify players who are likely to engage in future bad behavior are somewhat inaccurate in their predictions. These systems are also largely static in the sense that they are based on statically-defined rules and inputs, which means that they must be manually-adjusted to change the system's outputs. The disclosure made herein is presented with respect to these and other considerations.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
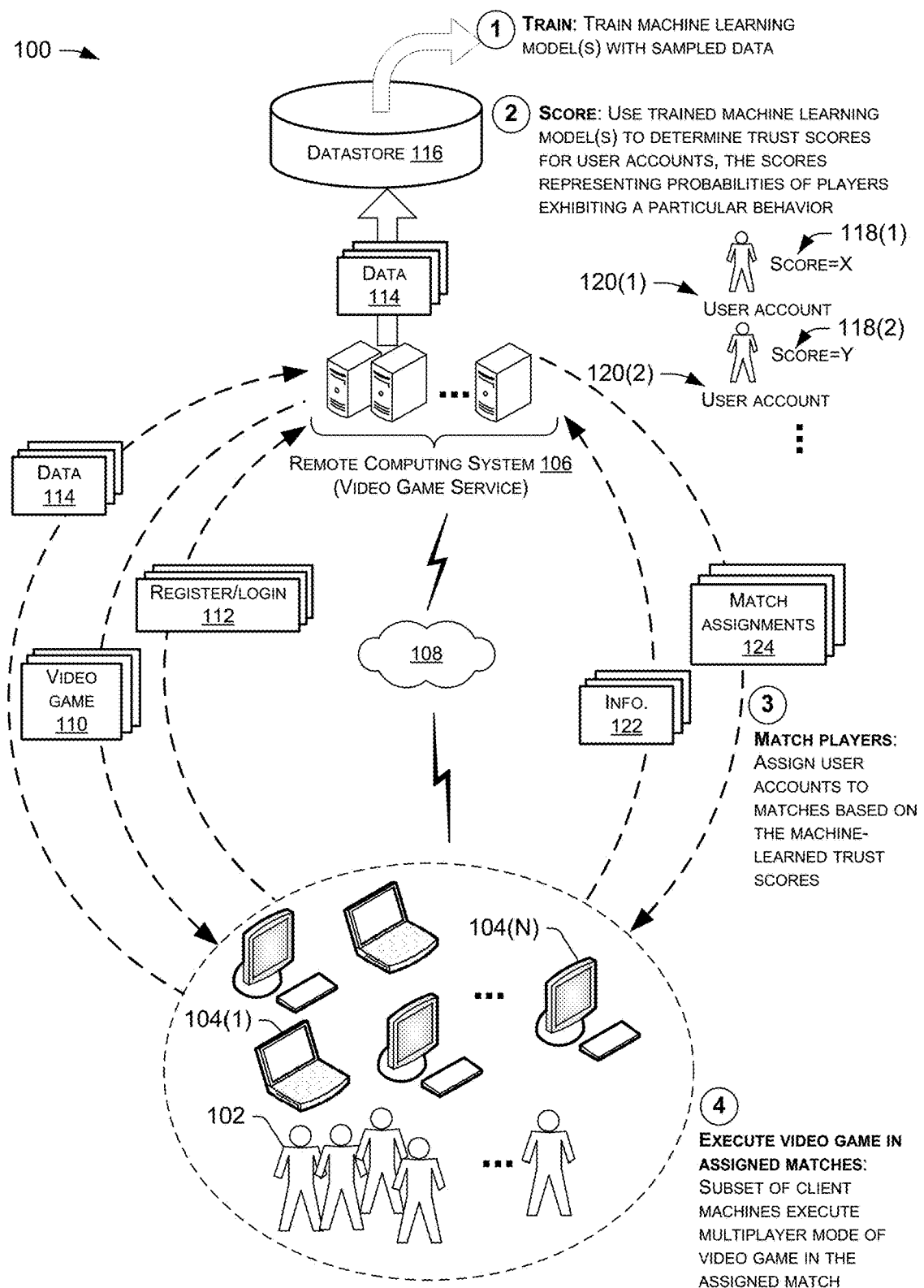
FIG. 1 is a diagram illustrating an example environment that includes a remote computing system configured to train and use a machine learning model(s) to determine trust scores relating to the likely behavior of a player(s), and to match players together based on the machine-learned trust scores.

Described herein are, among other things, techniques, devices, and systems for generating trust scores using a machine learning approach, and thereafter using the machine-learned trust scores to match players together in multiplayer video game settings. The disclosed techniques may be implemented, at least in part, by a remote computing system that distributes video games (and content thereof) to client machines of a user community as part of a video game service. These client machines may individually install a client application that is configured to execute video games received (e.g., downloaded, streamed, etc.) from the remote computing system. This video game platform enables registered users of the community to play video games as "players." For example, a user can load the client application, login with a registered user account, select a desired video game, and execute the video game on his/her client machine via the client application.

Whenever the above-mentioned users access and use this video game platform, data may be collected by the remote computing system, and this data can be maintained by the remote computing system in association with registered user accounts. Over time, one can appreciate that a large collection of historical data tied to registered user accounts may be available to the remote computing system. The remote computing system can then train one or more machine learning models using a portion of the historical data as training data. For instance, a portion of the historical data associated with a sampled set of user accounts can be represented by a set of features and labeled to indicate players who have behaved in a particular way in the past while playing a video game(s). A machine learning model(s) trained on this data is able to predict player behavior by outputting machine-learned scores (e.g., trust scores) for user accounts that are registered with the video game service. These machine-learned scores are usable for player matchmaking so that players who are likely to behave, or not behave, in accordance with a particular behavior can be grouped together in a multiplayer video game setting.

In an example process, a computing system may determine scores (e.g., trust scores) for a plurality of user accounts registered with a video game service. An individual score may be determined by accessing data associated with an individual user account, providing the data as input to a trained machine learning model(s), and generating, as output from the trained machine learning model, a score associated with the individual user account. The score relates to a probability of a player associated with the individual user account behaving, or not behaving, in accordance with a particular behavior while playing one or more video games in a multiplayer mode. Thereafter, the computing system may receive information from a plurality of client machines, the information indicating logged-in user accounts that are logged into a client application executing a video game, and the computing system may define multiple matches into which players are to be grouped for playing the video game in the multiplayer mode. These multiple matches may comprise at least a first match and a second match. The computing system may assign a first subset of the logged-in user accounts to the first match and a second subset of the logged-in user accounts to the second match based at least in part on the scores determined for the logged-in user accounts, and may cause a first subset of the client machines associated with the first subset of the logged-in user accounts to execute the video game in the first match, while causing a second subset of the client machines associated with the second subset of the logged-in user accounts to execute the video game in the second match.

The techniques and systems described herein may provide an improved gaming experience for users who desire to play a video game in multiplayer mode in the manner it was meant to be played. This is because the techniques and systems described herein are able to match together players who are likely to behave badly (e.g., cheat), and to isolate those players from other trusted players who are likely to play the video game legitimately. For example, the trained machine learning model(s) can learn to predict which players are likely to cheat, and which players are unlikely to cheat by attributing corresponding trust scores to the user accounts that are indicative of each player's propensity to cheating (or not cheating). In this manner, players with low (e.g., below threshold) trust scores may be matched together, and may be isolated from other players whose user accounts were attributed high (e.g., above threshold) trust scores, leaving the trusted players to play in a match without any players who are likely to cheat. Although the use of a threshold score is described as one example way of providing match assignments, other techniques are contemplated, such as clustering algorithms, or other statistical approaches that use the trust scores to preferentially match user accounts (players) with "similar" trust scores together (e.g., based on a similarity metric, such as a distance metric, a variance metric, etc.).

The techniques and systems described herein also improve upon existing matchmaking technology, which uses static rules to determine the trust levels of users. A machine-learning model(s), however, can learn to identify complex relationships of player behaviors to better predict player behavior, which is not possible with static rules-based approaches. Thus, the techniques and systems described herein allow for generating trust scores that more accurately predict player behavior, as compared to existing trust systems, leading to lower false positive rates and fewer instances of players being attributed an inaccurate trust score. The techniques and systems described herein are also more adaptive to changing dynamics of player behavior than existing systems because a machine learning model(s) is/are retrainable with new data in order to adapt the machine learning model(s) understanding of player behavior over time, as player behavior changes. The techniques and systems described herein may further allow one or more devices to conserve resources with respect to processing resources, memory resources, networking resources, etc., in the various ways described herein.

It is to be appreciated that, although many of the examples described herein reference "cheating" as a targeted behavior by which players can be scored and grouped for matchmaking purposes, the techniques and systems described herein may be configured to identify any type of behavior (good or bad) using a machine-learned scoring approach, and to predict the likelihood of players engaging in that behavior for purposes of player matchmaking. Thus, the techniques and systems may extend beyond the notion of "trust" scoring in the context of bad behavior, like cheating, and may more broadly attribute scores to user accounts that are indicative of a compatibility or an affinity between players.

FIG. 1 is a diagram illustrating an example environment 100 that includes a remote computing system configured to train and use a machine learning model(s) to determine trust scores relating to the likely behavior of a player(s), and to match players together based on the machine-learned trust scores. A community of users 102 may be associated with one or more client machines 104. The client machines 104(1)-(N) shown in FIG. 1 represent computing devices that can be utilized by users 102 to execute programs, such as video games, thereon. Because of this, the users 102 shown in FIG. 1 are sometimes referred to as "players" 102, and these names can be used interchangeably herein to refer to human operators of the client machines 104. The client machines 104 can be implemented as any suitable type of computing device configured to execute video games and to render graphics on an associated display, including, without limitation, a personal computer (PC), a desktop computer, a laptop computer, a mobile phone (e.g., a smart phone), a tablet computer, a portable digital assistant (PDA), a wearable computer (e.g., virtual reality (VR) headset, augmented reality (AR) headset, smart glasses, etc.), an in-vehicle (e.g., in-car) computer, a television (smart television), a set-top-box (STB), a game console, and/or any similar computing device. Furthermore, the client machines 104 may vary in terms of their respective platforms (e.g., hardware and software). For example, the plurality of client machines 104 shown in FIG. 1 may represent different types of client machines 104 with varying capabilities in terms of processing capabilities (e.g., central processing unit (CPU) models, graphics processing unit (GPU) models, etc.), graphics driver versions, and the like, The client machines 104 may communicate with a remote computing system 106 (sometimes shortened herein to "computing system 106," or "remote system 106") over a computer network 108. The computer network 108 may represent and/or include, without limitation, the Internet, other types of data and/or voice networks, a wired infrastructure (e.g., coaxial cable, fiber optic cable, etc.), a wireless infrastructure (e.g., radio frequencies (RF), cellular, satellite, etc.), and/or other connection technologies. The computing system 106 may, in some instances be part of a network-accessible computing platform that is maintained and accessible via the computer network 108. Network-accessible computing platforms such as this may be referred to using terms such as "on-demand computing", "software as a service (SaaS)", "platform computing", "network-accessible platform", "cloud services", "data centers", and so forth.

In some embodiments, the computing system 106 acts as, or has access to, a video game platform that implements a video game service to distribute (e.g., download, stream, etc.) video games 110 (and content thereof) to the client machines 104. In an example, the client machines 104 may each install a client application thereon. The installed client application may be a video game client (e.g., gaming software to play video games 110). A client machine 104 with an installed client application may be configured to download, stream, or otherwise receive programs (e.g., video games 110, and content thereof) from the computing system 106 over the computer network 108. Any type of content-distribution model can be utilized for this purpose, such as a direct purchase model where programs (e.g., video games 110) are individually purchasable for download and execution on a client machine 104, a subscription-based model, a content-distribution model where programs are rented or leased for a period of time, streamed, or otherwise made available to the client machines 104. Accordingly, an individual client machine 104 may include one or more installed video games 110 that are executable by loading the client application.

As shown by reference numeral 112 of FIG. 1, the client machines 104 may be used to register with, and thereafter login to, a video game service. A user 102 may create a user account for this purpose and specify/set credentials (e.g., passwords, PINs, biometric IDs, etc.) tied to the registered user account. As a plurality of users 102 interact with the video game platform (e.g., by accessing their user/player profiles with a registered user account, playing video games 110 on their respective client machines 104, etc.), the client machines 104 send data 114 to the remote computing system 106. The data 114 sent to the remote computing system 106, for a given client machine 104, may include, without limitation, user input data, video game data (e.g., game performance statistics uploaded to the remote system), social networking messages and related activity, identifiers (IDs) of the video games 110 played on the client machine 104, and so on. This data 114 can be streamed in real-time (or substantially real-time), sent the remote system 106 at defined intervals, and/or uploaded in response to events (e.g., exiting a video game).

FIG. 1 shows that the computing system 106 may store the data 114 it collects from the client machines 104 in a datastore 116, which may represent a data repository maintained by, and accessible to, the remote computing system 106. The data 114 may be organized within the datastore 116 in any suitable manner to associate user accounts with relevant portions of the data 114 relating to those user accounts. Over time, given a large community of users 102 that frequently interact with the video game platform, sometimes for long periods of time during a given session, a large amount of data 114 can be collected and maintained in the datastore 116.

At Step 1 in FIG. 1, the computing system 106 may train a machine learning model(s) using historical data 114 sampled from the datastore 116. For example, the computing system 106 may access a portion of the historical data 114 associated with a sampled set of user accounts registered with the video game service, and use the sampled data 114 to train the machine learning model(s). In some embodiments, the portion of the data 114 used as training data is represented by a set of features, and each user account of the sampled set is labeled with a label that indicates whether the user account is associated with a player who has behaved in accordance with the particular behavior while playing at least one video game in the past. For example, if a player with a particular user account has been banned by the video game service in the past for cheating, this "ban" can be used as one of multiple class labels for the particular user account. In this manner, a supervised learning approach can be taken to train the machine learning model(s) to predict players who are likely to cheat in the future.

At Step 2, the computing system 106 may score a plurality of registered user accounts using the trained machine learning model(s). For example, the computing system 106 may access, from the datastore 116, data 114 associated with a plurality of registered user accounts, provide the data 114 as input to the trained machine learning model(s), and generate, as output from the trained machine learning model(s), scores associated with the plurality of user accounts. These scores (sometimes referred to herein as "trust scores," or "trust factors") relate to the probabilities of players associated with the plurality of user accounts behaving, or not behaving, in accordance with the particular behavior while playing one or more video games in a multiplayer mode. In the case of "bad" behavior, such as cheating, the trust score may relate to the probability of a player not cheating. In this case, a high trust score indicates a trusted user account, whereas a low trust score indicates an untrusted user account, which may be used as an indicator of a player who is likely to exhibit the bad behavior, such as cheating. In some embodiments, the score is a variable that is normalized in the range of [0,1]. This trust score may have a monotonic relationship with a probability of a player behaving (or not behaving, as the case may be) in accordance with the particular behavior while playing a video game 110. The relationship between the score and the actual probability associated with the particular behavior, while monotonic, may or may not be a linear relationship. Of course, the scoring can be implemented in any suitable manner to predict whether a player tied to the user account will, or will not, behave in a particular way. FIG. 1 illustrates a plurality of user accounts 120 that have been scored according to the techniques described herein. For example, a first score 118(1) (score=X) is attributed to a first user account 120(1), a second score 118(2) (score=Y) is attributed to a second user account 120(2), and so on and so forth, for any suitable number of registered user accounts 120.

With the machine-learned scores 118 determined for a plurality of registered user accounts 120, the computing system 106 may be configured to match players together in multiplayer video game settings based at least in part on the machine-learned scores 118. For instance, FIG. 1 shows that the computing system 106 may receive information 122 from a plurality of the client machines 104 that have started execution of a video game 110. This information 122 may indicate, to the computing system 106, that a set of logged-in user accounts 120 are currently executing a video game 110 on each client machine 104 via the installed client application. In other words, as players 102 login with their user accounts 120 and start to execute a particular video game 110, requesting to play in multiplayer mode, their respective client machines 104 may provide information 122 to the computing system 106 indicating as much.

At Step 3, the computing device 106, in response to receiving this information 122 from the client machines 104, may match players 102 together by defining multiple matches into which players 102 are to be grouped for playing the video game 110 in the multiplayer mode, and by providing match assignments 124 to the client machines 104 in order to assign subsets of the logged-in user accounts 120 to different ones of the multiple matches based at least in part on the machine-learned scores 118 that were determined for the logged-in user accounts 120. In this manner, if the trained machine learning model(s) assigned low (e.g., below threshold) scores 118 to a first subset of the logged-in user accounts 120 and high (e.g., above threshold) scores 118 to a second subset of the logged-in user accounts 120, the first subset of the logged-in user accounts 120 may be assigned to a first match of the multiple matches, and the second subset of the logged-in user accounts 120 may be assigned to a second, different match of the multiple matches. In this manner, a subset of players 102 with similar scores 118 may be grouped together and may remain isolated from other players with scores 118 that are dissimilar from the subset of players' 102 scores 118.

At Step 4, the client applications on each machine 104 executing the video game 110 may execute the video game 110 in the assigned match the logged-in user account 120 in question. For example, a first subset of client machines 104 may be associated with a first subset of the logged-in user accounts 120 that were assigned to the first match, and this first subset of client machines 104 may execute the video game 110 in the first match, while a second subset of client machines 104—associated with the second subset of the logged-in user accounts 120 assigned to the second match—may execute the video game 110 in the second match. With players grouped into matches based at least in part on the machine-learned scores 118, the in-game experience may be improved for at least some of the groups of players 102 because the system may group players predicted to behave badly (e.g., by cheating) together in the same match, and by doing so, may keep the bad-behaving players isolated from other players who want to play the video game 110 legitimately.

Figure 2:
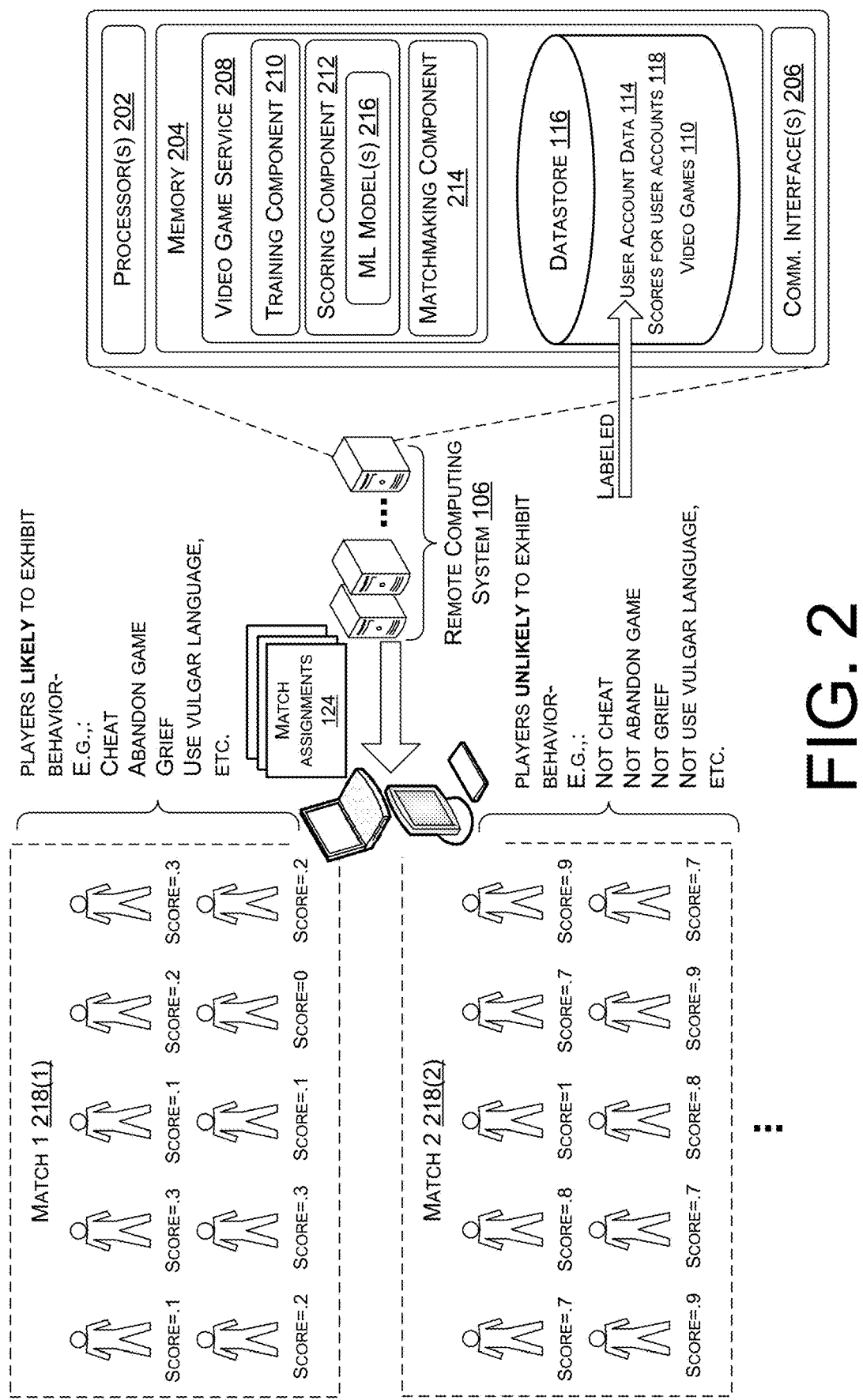
FIG. 2 shows a block diagram illustrating example components of the remote computing system of FIG. 1, as well as a diagram illustrating how machine-learned trust scoring can be used for player matchmaking.

FIG. 2 shows a block diagram illustrating example components of the remote computing system 106 of FIG. 1, as well as a diagram illustrating how machine-learned trust scoring can be used for player matchmaking. In the illustrated implementation, the computing system 106 includes, among other components, one or more processors 202 (e.g., a central processing unit(s) (CPU(s))), memory 204 (or non-transitory computer-readable media 204), and a communications interface(s) 206. The memory 204 (or non-transitory computer-readable media 204) may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 204 may be implemented as computer-readable storage media ("CRSM"), which may be any available physical media accessible by the processor(s) 202 to execute instructions stored on the memory 204. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 202. A video game service 208 may represent instructions stored in the memory 204 that, when executed by the processor(s) 202, cause the computing system 106 to perform the techniques and operations described herein.

For example, the video game service 208 may include a training component 210, a scoring component 212, and a matchmaking component 214, among other possible components. The training component 210 may be configured to train a machine learning model(s) using a portion of the data 114 in the datastore 116 that is associated with a sampled set of user accounts 120 as training data to obtain a trained machine learning model(s) 216. The trained machine learning model(s) 216 is usable by the scoring component 212 to determine scores 118 (e.g., trust scores 118) for a plurality of registered user accounts 120. The matchmaking component 214 provides match assignments 124 based at least in part on the machine-learned scores 118 so that players are grouped into different ones of multiple matches 218 (e.g., a first match 218(1), a second match 218(2), etc.) for playing a video game 110 in the multiplayer mode. FIG. 2 shows how a first group of players 102 (e.g., ten players 102) associated with a first subset of logged-in user accounts 120 may be assigned to a first match 218(1), and a second group of players 102 (e.g., another ten players 102) associated with a second subset of logged-in user accounts 120 are assigned to a second match 218(2). Of course, any number of matches 218 may be defined, which may depend on the number of logged-in user accounts 120 that request to execute the video game 110 in multiplayer mode, a capacity limit of network traffic that the computing system 106 can handle, and/or other factors. In some embodiments, other factors (e.g., skill level, geographic region, etc.) are considered in the matchmaking process, which may cause further breakdowns and/or subdivisions of players into a fewer or greater number of matches 218.

As mentioned, the scores 118 determined by the scoring component 212 (e.g., output by the trained machine learning model(s) 216) are machine-learned scores 118. Machine learning generally involves processing a set of examples (called "training data") in order to train a machine learning model(s). A machine learning model(s) 216, once trained, is a learned mechanism that can receive new data as input and estimate or predict a result as output. For example, a trained machine learning model 216 can comprise a classifier that is tasked with classifying unknown input (e.g., an unknown image) as one of multiple class labels (e.g., labeling the image as a cat or a dog). In some cases, a trained machine learning model 216 is configured to implement a multi-label classification task (e.g., labeling images as "cat," "dog," "duck," "penguin," and so on). Additionally, or alternatively, a trained machine learning model 216 can be trained to infer a probability, or a set of probabilities, for a classification task based on unknown data received as input. In the context of the present disclosure, the unknown input may be data 114 that is associated with an individual user account 120 registered with the video game service, and the trained machine learning model(s) 216 may be tasked with outputting a score 118 (e.g., a trust score 118) that indicates, or otherwise relates to, a probability of the individual user account 120 being in one of multiple classes. For instance, the score 118 may relate to a probability of a player 102 associated with the individual user account 120 behaving (or not behaving, as the case may be) in accordance with a particular behavior while playing a video game 110 in a multiplayer mode. In some embodiments, the score 118 is a variable that is normalized in the range of [0,1]. This trust score 118 may have a monotonic relationship with a probability of a player 102 behaving (or not behaving, as the case may be) in accordance with the particular behavior while playing a video game 110. The relationship between the score 118 and the actual probability associated with the particular behavior, while monotonic, may or may not be a linear relationship. In some embodiments, the trained machine learning model(s) 216 may output a set of probabilities (e.g., two probabilities), or scores relating thereto, where one probability (or score) relates to the probability of the player 102 behaving in accordance with the particular behavior, and the other probability (or score) relates to the probability of the player 102 not behaving in accordance with the particular behavior. The score 118 that is output by the trained machine learning model(s) 216 can relate to either of these probabilities in order to guide the matchmaking processes. In an illustrative example, the particular behavior may be cheating. In this example, the score 118 that is output by the trained machine learning model(s) 216 relates to a likelihood that the player 102 associated with the individual user account 120 will, or will not, go on to cheat during the course of playing a video game 110 in multiplayer mode. Thus, the score 118 can, in some embodiments, indicate a level of trustworthiness of the player 102 associated with the individual user account 120, and this is why the score 118 described herein is sometimes referred to as a "trust score" 118.

The trained machine learning model(s) 216 may represent a single model or an ensemble of base-level machine learning models, and may be implemented as any type of machine learning model 216. For example, suitable machine learning models 216 for use with the techniques and systems described herein include, without limitation, neural networks, tree-based models, support vector machines (SVMs), kernel methods, random forests, splines (e.g., multivariate adaptive regression splines), hidden Markov model (HMMs), Kalman filters (or enhanced Kalman filters), Bayesian networks (or Bayesian belief networks), expectation maximization, genetic algorithms, linear regression algorithms, nonlinear regression algorithms, logistic regression-based classification models, or an ensemble thereof. An "ensemble" can comprise a collection of machine learning models 216 whose outputs (predictions) are combined, such as by using weighted averaging or voting. The individual machine learning models of an ensemble can differ in their expertise, and the ensemble can operate as a committee of individual machine learning models that is collectively "smarter" than any individual machine learning model of the ensemble.

The training data that is used to train the machine learning model 216 may include various types of data 114. In general, training data for machine learning can include two components: features and labels. However, the training data used to train the machine learning model(s) 216 may be unlabeled, in some embodiments. Accordingly, the machine learning model(s) 216 may be trainable using any suitable learning technique, such as supervised learning, unsupervised learning, semi-supervised learning, reinforcement learning, and so on. The features included in the training data can be represented by a set of features, such as in the form of an n-dimensional feature vector of quantifiable information about an attribute of the training data. The following is a list of example features that can be included in the training data for training the machine learning model(s) 216 described herein. However, it is to be appreciated that the following list of features is non-exhaustive, and features used in training may include additional features not described herein, and, in some cases, some, but not all, of the features listed herein. Example features included in the training data may include, without limitation, an amount of time a player spent playing video games 110 in general, an amount of time a player spent playing a particular video game 110, times of the day the player was logged in and playing video games 110, match history data for a player—e.g., total score (per match, per round, etc.), headshot percentage, kill count, death count, assist count, player rank, etc., a number and/or frequency of reports of a player cheating, a number and/or frequency of cheating acquittals for a player, a number and/or frequency of cheating convictions for a player, confidence values (score) output by a machine learning model that detected a player of cheat during a video game, a number of user accounts 120 associated with a single player (which may be deduced from a common address, phone number, payment instrument, etc. tied to multiple user accounts 120), how long a user account 120 has been registered with the video game service, a number of previously-banned user accounts 120 tied to a player, number and/or frequency of a player's monetary transactions on the video game platform, a dollar amount per transaction, a number of digital items of monetary value associated with a player's user account 120, number of times a user account 120 has changed hands (e.g., been transfers between different owners/players), a frequency at which a user account 120 is transferred between players, geographic locations from which a player has logged-in to the video game service, a number of different payment instruments, phone numbers, mailing addresses, etc. that have been associated with a user account 120 and/or how often these items have been changed, and/or any other suitable features that may be relevant in computing a trust score 118 that is indicative of a player's propensity to engage in a particular behavior. As part of the training process, the training component 210 may set weights for machine learning. These weights may apply to a set of features included in the training data, as derived from the historical data 114 in the datastore 116. In some embodiments, the weights that are set during the training process may apply to parameters that are internal to the machine learning model(s) (e.g., weights for neurons in a hidden-layer of a neural network). These internal parameters of the machine learning model(s) may or may not map one-to-one with individual input features of the set of features. The weights can indicate the influence that any given feature or parameter has on the score 118 that is output by the trained machine learning model 216.

In regards to cheating in particular—which is an illustrative example of a type of behavior that can be used as a basis for matching players, there may be behaviors associated with a user account 120 of a player who is planning on cheating in a video game 110 that are unlike behaviors associated with a user account 120 of a non-cheater. Thus, the machine learning model 216 may learn to identify those behavioral patterns from the training data so that players who are likely to cheat can be identified with high confidence and scored appropriately. It is to be appreciated that there may be outliers in the ecosystem that the system can be configured to protect based on some known information about the outliers. For example, professional players may exhibit different behavior than average players exhibit, and these professional players may be at risk of being scored incorrectly. As another example, employees of the service provider of the video game service may login with user accounts for investigation purposes or quality control purposes, and may behave in ways that are unlike the average player's behavior. These types of players/users 102 can be treated as outliers and proactively assigned a score 118, outside of the machine learning context, that attributes a high trust to those players/users 102. In this manner, well-known professional players, employees of the service provider, and the like, can be assigned an authoritative score 118 that is not modifiable by the scoring component 212 to avoid having those players/users 102 matched with bad-behaving players.

The training data may also be labeled for a supervised learning approach. Again, using cheating as an example type of behavior that can be used to match players together, the labels in this example may indicate whether a user account 120 was banned from playing a video game 110 via the video game service. The data 114 in the datastore 116 may include some data 114 associated with players who have been banned cheating, and some data 114 associated with players who have not been banned for cheating. An example of this type of ban is a Valve Anti-Cheat (VAC) ban utilized by Valve Corporation of Bellevue, Wash. For instance, the computing system 106, and/or authorized users of the computing system 106, may be able to detect when unauthorized third party software has been used to cheat. In these cases, after going through a rigorous verification process to make sure that the determination is correct, the cheating user account 120 may be banned by flagging it as banned in the datastore 116. Thus, the status of a user account 120 in terms of whether it has been banned, or not banned, can be used as positive, and negative, training examples.

It is to be appreciated that past player behavior, such as past cheating, can be indicated in other ways. For example, a mechanism can be provided for users 102, or even separate machine learning models, to detect and report players for suspected cheating. These reported players may be put before a jury of their peers who review the game playback of the reported player and render a verdict (e.g., cheating or no cheating). If enough other players decide that the reported player's behavior amounts to cheating, a high confidence threshold may be reached and the reported player is convicted of cheating and receives a ban on their user account 120.

FIG. 2 illustrates examples of other behaviors, besides cheating, which can be used as a basis for player matchmaking. For example, the trained machine learning model(s) 216 may be configured to output a trust score 118 that relates to the probability of a player behaving, or not behaving, in accordance with a game-abandonment behavior (e.g., by abandoning (or exiting) the video game in the middle of a match). Abandoning a game is a behavior that tends to ruin the gameplay experience for non-abandoning players, much like cheating. As another example, the trained machine learning model(s) 216 may be configured to output a trust score 118 that relates to the probability of a player behaving, or not behaving, in accordance with a griefing behavior. A "griefer" is a player in a multiplayer video game who deliberately irritates and harasses other players within the video game 110, which can ruin the gameplay experience for non-griefing players. As another example, the trained machine learning model(s) 216 may be configured to output a trust score 118 that relates to the probability of a player behaving, or not behaving, in accordance with a vulgar language behavior. Oftentimes, multiplayer video games allow for players to engage in chat sessions or other social networking communications that are visible to the other players in the video game 110, and when a player uses vulgar language (e.g., curse words, offensive language, etc.), it can ruin the gameplay experience for players who do not use vulgar language. As yet another example, the trained machine learning model(s) 216 may be configured to output a trust score 118 that relates to a probability of a player behaving, or not behaving, in accordance with a "high-skill" behavior. In this manner, the scoring can be used to identify highly-skilled players, or novice players, from a set of players. This may be useful to prevent situations where experienced gamers create new user accounts pretending to be a player of a novice skill level just so that they can play with amateur players. Accordingly, the players matched together in the first match 218(1) may be those who are likely (as determined from the machine-learned scores 118) to behave in accordance with a particular "bad" behavior, while the players matched together in other matches, such as the second match 218(2) may be those who are unlikely to behave in accordance with the particular "bad" behavior.

It may be the case that the distribution of trust scores 118 output for a plurality of players (user accounts 120) is largely bimodal. For example, one peak of the statistical distribution of scores 118 may be associated with players likely to behave in accordance with a particular bad behavior, while the other peak of the statistical distribution of scores 118 may be associated with players unlikely to behave in accordance with that bad behavior. In other words, the populations of bad-behaving and good-behaving players may be separated by a clear margin in the statistical distribution. In this sense, if a new user account is registered with the video game service and is assigned a trust score that is between the two peaks in the statistical distribution, that user account will quickly be driven one way or another as the player interacts with the video game platform. Due to this tendency, the matchmaking parameters used by the matchmaking component 214 can be tuned to treat players with trust scores 118 that are not within the bottom peak of the statistical distribution similarly, and the matchmaking component 214 may be primarily concerned with separating/isolating the bad-behaving players with trust scores 118 that are within the bottom peak of the statistical distribution. Although the use of a threshold score is described herein as one example way of providing match assignments, other techniques are contemplated, such as clustering algorithms, or other statistical approaches that use the trust scores to preferentially match user accounts (players) with "similar" trust scores together (e.g., based on a similarity metric, such as a distance metric, a variance metric, etc.).

Furthermore, the matchmaking component 214 may not use player matchmaking for new user accounts 120 that have recently registered with the video game service. Rather, a rule may be implemented that a player is to accrue a certain level of experience/performance in an individual play mode before being scored and matched with other players in a multiplayer mode of a video game 110. It is to be appreciated that the path of a player from the time of launching a video game 110 for the first time to having access to the player matchmaking can be very different for different players. It may take some players a long time to gain access to a multiplayer mode with matchmaking, while other users breeze through the qualification process quickly. With this qualification process in place, a user account that is to be scored for matchmaking purposes will have played video games and provided enough data 114 to score 118 the user account 120 accurately.

Again, as mentioned, although many of the examples described herein reference "bad" behavior, such as cheating, game-abandonment, griefing, vulgar language, etc. as the targeted behavior by which players can be scored and grouped for matchmaking purposes, the techniques and systems described herein may be configured to identify any type of behavior using a machine-learned scoring approach, and to predict the likelihood of players engaging in that behavior for purposes of player matchmaking.

Figure 3:
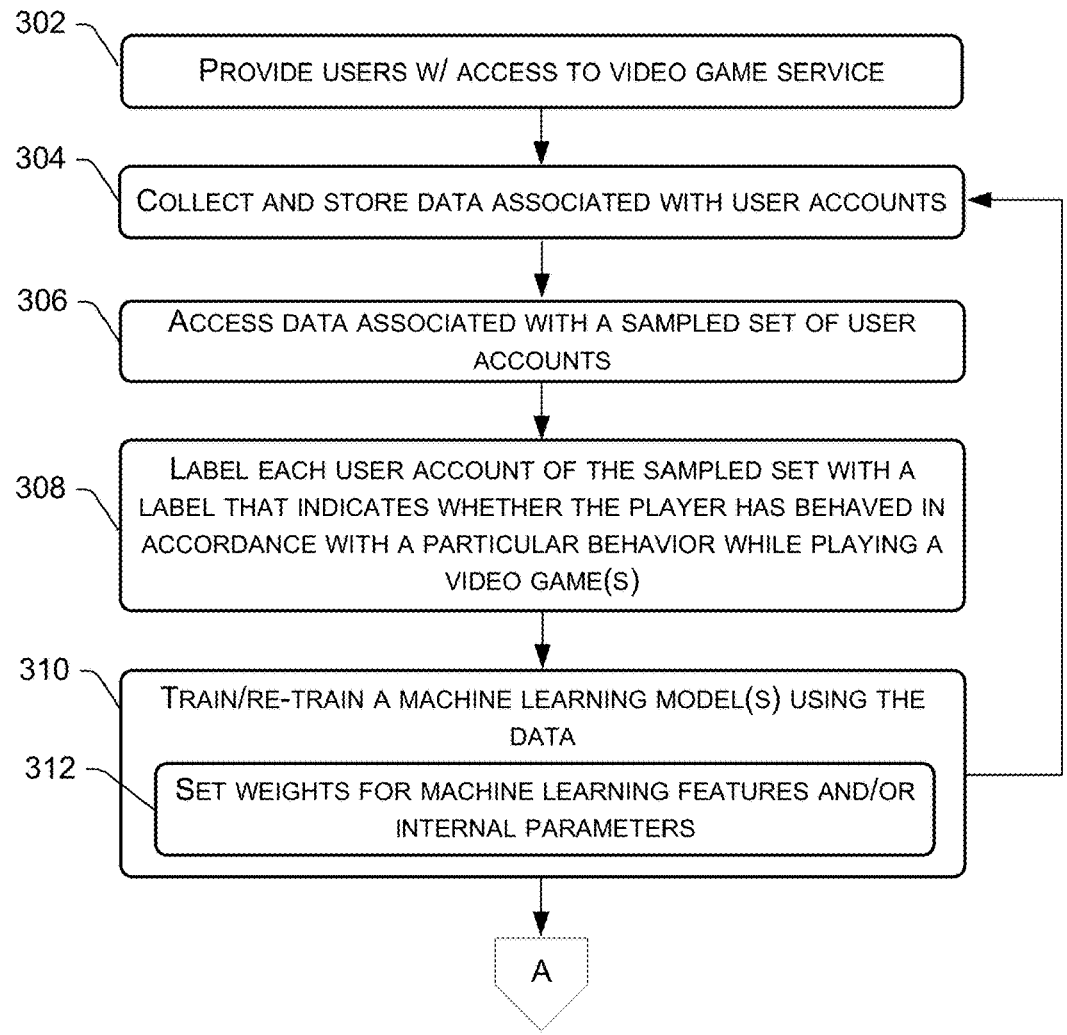
FIG. 3 is a flow diagram of an example process for training a machine learning model(s) to predict a probability of a player behaving, or not behaving, in accordance with a particular behavior.

The processes described herein are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes FIG. 3 is a flow diagram of an example process 300 for training a machine learning model(s) to predict a probability of a player behaving, or not behaving, in accordance with a particular behavior. For discussion purposes, the process 300 is described with reference to the previous figures.

At 302, a computing system 106 may provide users 102 with access to a video game service. For example, the computing system 106 may allow users to access and browse a catalogue of video games 110, modify user profiles, conduct transactions, engage in social media activity, and other similar actions. The computing system 106 may distribute video games 110 (and content thereof) to client machines 104 as part of the video game service. In an illustrative example, a user 102 with access to the video game service can load an installed client application, login with a registered user account, select a desired video game 110, and execute the video game 110 on his/her client machine 104 via the client application.

At 304, the computing system 106 may collect and store data 114 associated with user accounts 120 that are registered with the video game service. This data 114 may be collected at block 304 whenever users 102 access the video game service with their registered user accounts 120 and use this video game platform, such as to play video games 110 thereon. Over time, one can appreciate that a large collection of data 114 tied to registered user accounts may be available to the computing system 106.

At 306, the computing system 106, via the training component 210, may access (historical) data 114 associated with a sampled set of user accounts 120 registered with the video game service. At least some of the (historical) data 114 may have been generated as a result of players playing one or multiple video games 110 on the video game platform provided by the video game service. For example, the (historical) data 114 accessed at 306 may represent match history data of the players who have played one or multiple video games 110 (e.g., in the multiplayer mode by participating in matches). In some embodiments, the (historical) data 114 may indicate whether the sampled set of user accounts 120 have been transferred between players, or other types of user activities with respect to user accounts 120.

At 308, the computing system 106, via the training component 210, may label each user account 120 of the sampled set of user accounts 120 with a label that indicates whether the user account is associated with a player who has behaved in accordance with the particular behavior while playing at least one video game 110 in the past. Examples of labels are described herein, such as whether a user account 120 has been banned in the past for cheating, which may be used as a label in the context of scoring players on their propensity to cheat, or not cheat, as the case may be. However, the labels may correspond to other types of behavior, such as a label that indicates whether the user account is associated with a player who has abandoned a game in the past, griefed during a game in the past, used vulgar language during a game in the past, etc.

At 310, the computing system 106, via the training component 210, may train a machine learning model(s) using the (historical) data 114 as training data to obtain the trained machine learning model(s) 216. As shown by sub-block 312, the training of the machine learning model(s) at block 310 may include setting weights for machine learning. These weights may apply to a set of features derived from the historical data 114. Example features are described herein, such as those described above with reference to FIG. 2. In some embodiments, the weights set at block 312 may apply to parameters that are internal to the machine learning model(s) (e.g., weights for neurons in a hidden-layer of a neural network). These internal parameters of the machine learning model(s) may or may not map one-to-one with individual input features of the set of features. As shown by the arrow from block 310 to block 304, the machine learning model(s) 216 can be retrained using updated (historical) data 114 to obtain a newly trained machine learning model(s) 216 that is adapted to recent player behaviors. This allows the machine learning model(s) 216 to adapt, over time, to changing player behaviors.

Figure 4:
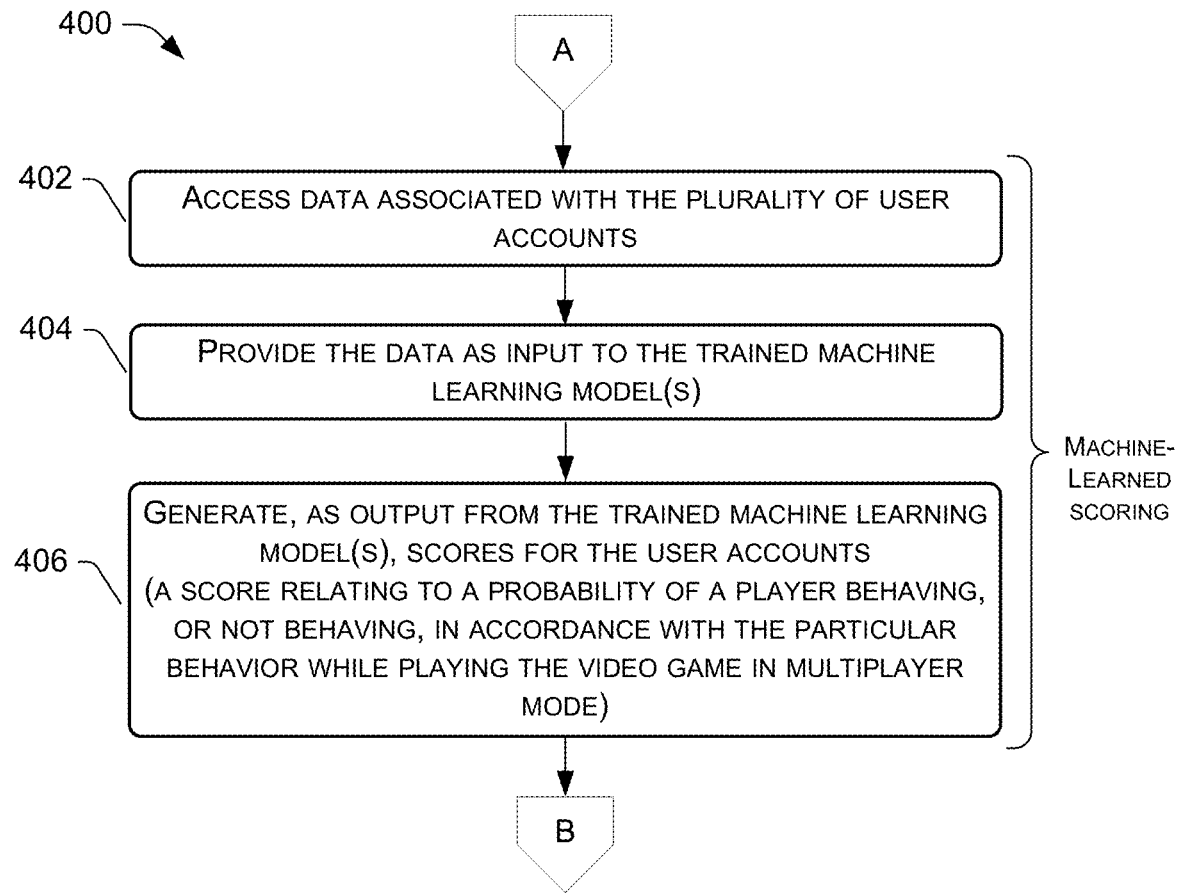
FIG. 4 is a flow diagram of an example process for utilizing a trained machine learning model(s) to determine trust scores for user accounts, the trust scores relating to probabilities of players behaving, or not behaving, in accordance with a particular behavior.

FIG. 4 is a flow diagram of an example process 400 for utilizing a trained machine learning model(s) 216 to determine trust scores 118 for user accounts 120, the trust scores 118 relating to (or indicative of) probabilities of players behaving, or not behaving, in accordance with a particular behavior. For discussion purposes, the process 400 is described with reference to the previous figures. Furthermore, as indicated by the off-page reference "A" in FIGS. 3 and 4, the process 400 may continue from block 310 of the process 300.

At 402, the computing system 106, via the scoring component 212, may access data 114 associated with a plurality of user accounts 120 registered with a video game service. This data 114 may include any information (e.g., quantifiable information) in the set of features, as described herein, the features having been used to train the machine learning model(s) 216. This is data 114 constitutes the unknown input that is to be input to the trained machine learning model(s) 216.

At 404, the computing system 106, via the scoring component 212, may provide the data 114 accessed at block 402 as input to the trained machine learning model(s) 216.

At 406, the computing system 106, via the scoring component 212, may generate, as output from the trained machine learning model(s) 216, trust scores 118 associated with the plurality of user accounts 120. On an individual basis, a score 118 is associated with an individual user account 120, of the plurality of use accounts 120, and the score 118 relates to a probability of a player 102 associated with the individual user account 120 behaving, or not behaving, in accordance with a particular behavior while playing one or more video games 110 in a multiplayer mode. The particular behavior, in this context, may be any suitable behavior that is exhibited in the data 114 so that the machine learning model(s) can be trained to predict players with a propensity to engage in that behavior. Examples include, without limitation, a cheating behavior, a game-abandonment behavior, a griefing behavior, or a vulgar language behavior. In some embodiments, the score 118 is a variable that is normalized in the range of [0,1]. This trust score 118 may have a monotonic relationship with a probability of a player behaving (or not behaving, as the case may be) in accordance with the particular behavior while playing a video game 110. The relationship between the score 118 and the actual probability associated with the particular behavior, while monotonic, may or may not be a linear relationship.

Thus, the process 400 represents a machine-learned scoring approach, where scores 118 (e.g., trust scores 118) are determined for user accounts 120, the scores indicating the probability of a player using that user account 120 engaging in a particular behavior in the future. Use of a machine-learning model(s) in this scoring process allows for identifying complex relationships of player behaviors to better predict player behavior, as compared to existing approaches that attempt to predict the same. This leads to a more accurate prediction of player behavior with a more adaptive and versatile system that can adjust to changing dynamics of player behavior without human intervention.

Figure 5:
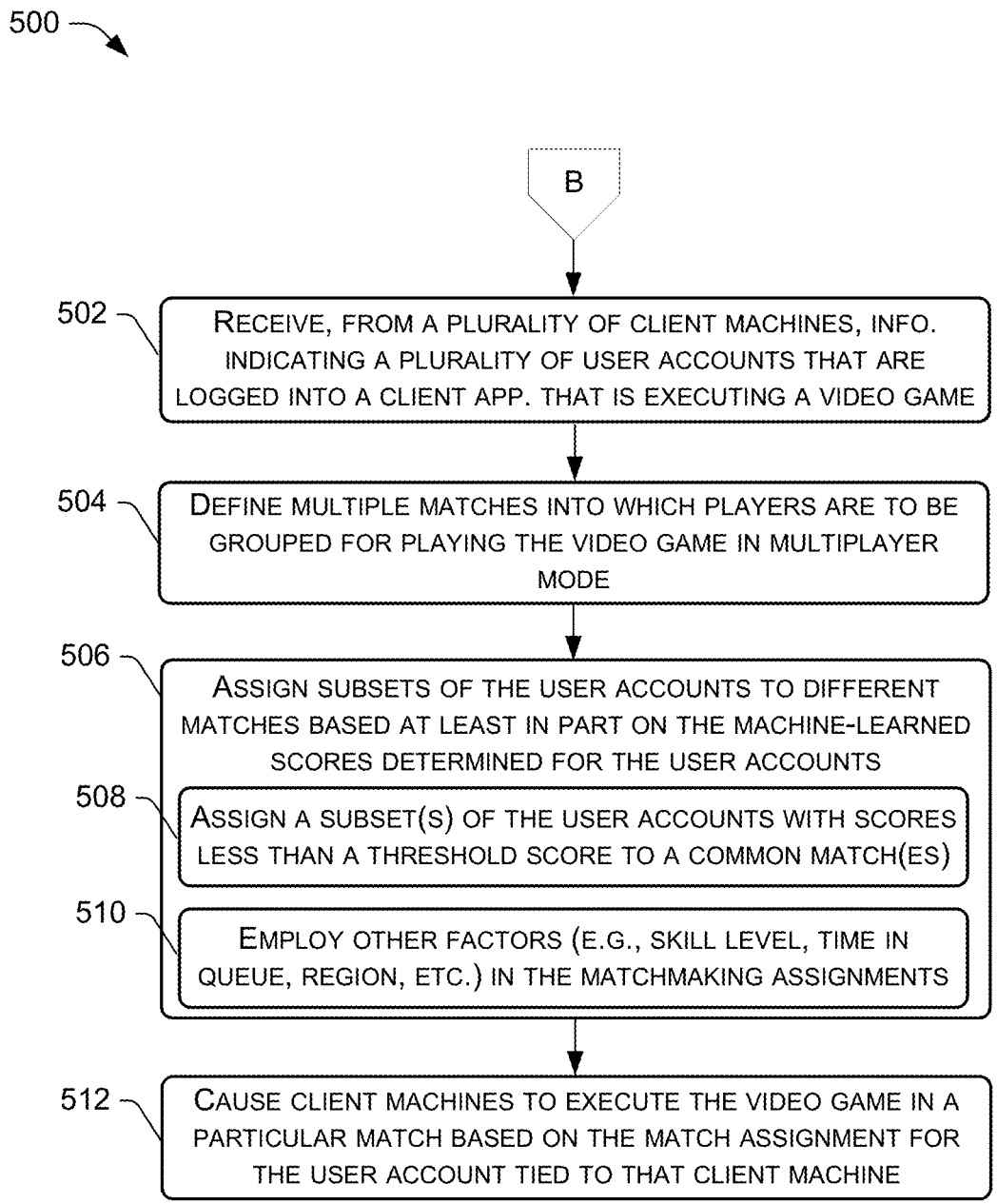
FIG. 5 is a flow diagram of an example process for assigning user accounts to different matches of a multiplayer video game based on machine-learned trust scores that relate to likely player behavior.

FIG. 5 is a flow diagram of an example process 500 for assigning user accounts 120 to different matches of a multiplayer video game based on machine-learned trust scores 118 that relates to likely player behavior. For discussion purposes, the process 500 is described with reference to the previous figures. Furthermore, as indicated by the off-page reference "B" in FIGS. 4 and 5, the process 500 may continue from block 406 of the process 400.

At 502, the computing system 106 may receive information 122 from a plurality of client machines 104, the information 122 indicating logged-in user accounts 120 that are logged into a client application executing a video game 110 on each client machine 104. For example, a plurality of players 102 may have started execution of a particular video game 110 (e.g., a first-person shooter game), wanting to play the video game 110 in multiplayer mode. The information 112 received 122 at block 502 may indicate at least the logged-in user accounts 120 for those players.

At 504, the computing system 106, via the matchmaking component 214, may define multiple matches into which players 102 are to be grouped for playing the video game 110 in the multiplayer mode. Any number of matches can be defined, depending on various factors, including demand, capacity, and other factors that play into the matchmaking process. In an example, the multiple defined matches at block 504 may include at least a first match 218(1) and a second match 218(2).

At 506, the computing system 106, via the matchmaking component 214, may assign a first subset of the logged-in user accounts 120 to the first match 218(1), and a second subset of the logged-in user accounts 120 to the second match 218(2) based at least in part on the scores 118 determined for the logged-in user accounts 120. As mentioned, any number of matches can be defined such that further breakdowns and additional matches can be assigned to user accounts at block 506.

As shown by sub-block 508, the assignment of user accounts 120 to different matches may be based on a threshold score. For instance, the matchmaking component 214 may determine that the scores 118 associated with the first subset of the logged-in user accounts 120 are less than a threshold score and may assign the first subset of the logged-in user accounts 120 to the first match based on those scores being less than the threshold score. Similarly, the matchmaking component 214 may determine that the scores 118 associated with the second subset of the logged-in user accounts 120 are equal to or greater than the threshold score and may assign the second subset of the logged-in user accounts 120 to the second match based on those scores being equal to or greater than the threshold score. This is merely one example way of providing match assignments 124, however, and other techniques are contemplated. For instance, clustering algorithms, or other statistical approaches may be used in addition, or as an alternative, to the use of a threshold score. In an example, the trust scores 118 may be used to preferentially match user accounts (players) with "similar" trust scores together. Given a natural tendency of the distribution of trust scores 118 to be largely bimodal across a plurality of user accounts 120, grouping trust scores 118 together based on a similarity metric (e.g., a distance metric, a variance metric, etc.) may provide similar results to that of using a threshold score. However, the use of a similarity metric to match user accounts together in groups for matchmaking purposes may be useful in instances where the matchmaking pool is small (e.g., players in a small geographic region who want to play less popular game modes) because it can provide a more fine-grained approach that allows for progressive tuning of the relative importance of the trust score verses other matchmaking factors, like skill level. In some embodiments, multiple thresholds may be used to "bucketize" user accounts 120 into multiple different matches.

As shown by sub-block 510, other factors besides the trust score 118 can be considered in the matchmaking assignments at block 506. For example, the match assignments 124 determined at block 506 may be further based on skill levels of players associated with the logged-in user accounts, amounts of time the logged-in user accounts have been waiting to be placed into one of the multiple matches, geographic regions associated with the logged-in user accounts, and/or other factors.

At 512, the computing system 106 may cause (e.g., by providing control instructions) the client application executing the video game 110 on each client machine 104 that sent the information 122 to initiate one of the defined matches (e.g., one of the first match 218(1) or the second match 218(2)) based at least in part on the logged-in user account 120 that is associated with that the client machine 104. For example, with the first match 218(1) and the second match 218(2) defined, the computing system 106 may cause a first subset of the plurality of client machines 104 associated with the first subset of the logged-in user accounts 120 to execute the video game 110 in the first match 218(1), and may cause a second subset of the plurality of client machines 104 associated with the second subset of the logged-in user accounts 120 to execute the video game 110 in the second match 218(2).

Because machine-learned trust scores 118 are used as a factor in the matchmaking process, an improved gaming experience may be provided to users who desire to play a video game in multiplayer mode in the manner it was meant to be played. This is because the techniques and systems described herein can be used to match together players who are likely to behave badly (e.g., cheat), and to isolate those players from other trusted players who are likely to play the video game legitimately.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A method, comprising:
    training a machine learning model using training data to obtain a trained machine learning model;
    accessing, by a computing system, data associated with a plurality of user accounts registered with a video game service;

determining trust scores associated with the plurality of user accounts by:
    identifying a first user account of the plurality of user accounts that is associated with at least one of a professional player or an employee of a service provider of the video game service;
    proactively assigning a predetermined trust score to the first user account without using the trained machine learning model;
    providing the data associated with the plurality of user accounts other than the first user account as input to the trained machine learning model; and
    generating, as output from the trained machine learning model, additional trust scores associated with the plurality of user accounts other than the first user account, the additional trust scores relating to probabilities of players associated with the plurality of user accounts other than the first user account cheating, or not cheating, while playing one or more video games in a multiplayer mode;
  receiving, from a plurality of client machines, information indicating logged-in user accounts, of the plurality of user accounts, that are currently logged into a client application that is executing a video game on each client machine of the plurality of client machines;
  defining, by the computing system, multiple matches into which players associated with the logged-in user accounts are to be grouped for playing the video game in the multiplayer mode, the multiple matches comprising at least a first match and a second match;
  assigning, by the computing system, a first subset of the logged-in user accounts to the first match based at least in part on the trust scores associated with the first subset;
  assigning, by the computing system, a second subset of the logged-in user accounts to the second match based at least in part on the trust scores associated with the second subset; and
  causing, by the computing system, the client application executing the video game on each client machine to initiate one of the first match or the second match based at least in part on a user account, of the logged-in user accounts, that is associated with the client machine.

2. The method of claim 1, wherein the training data includes labels for each user account of a sampled set of user accounts indicating whether the user account is associated with a player who has cheated while playing at least one video game.

3. The method of claim 1, further comprising retraining the machine learning model using updated training data to obtain a newly trained machine learning model that is adapted to recent player behaviors.

4. A method, comprising:
  training a machine learning model using training data to obtain a trained machine learning model;
  determining, by a computing system, scores for a plurality of user accounts registered with a video game service, wherein the scores are determined by:
    identifying a first user account of the plurality of user accounts that is associated with at least one of a professional player or an employee of a service provider of the video game service;
    proactively assigning a predetermined score to the first user account without using the trained machine learning model;
    accessing data associated with an individual user account of the plurality of user accounts other than the first user account;
    providing the data as input to the trained machine learning model; and
    generating, as output from the trained machine learning model, a score associated with the individual user account, the score indicative of a probability of a player associated with the individual user account cheating, or not cheating, while playing one or more video games in a multiplayer mode;
  receiving, by the computing system, information from a plurality of client machines, the information indicating logged-in user accounts, of the plurality of user accounts, that are logged into a client application executing a video game;
  defining, by the computing system, multiple matches into which players associated with the logged-in user accounts are to be grouped for playing the video game in the multiplayer mode, the multiple matches comprising at least a first match and a second match;
  assigning, by the computing system, a first subset of the logged-in user accounts to the first match and a second subset of the logged-in user accounts to the second match based at least in part on the scores determined for the logged-in user accounts;
  causing, by the computing system, a first subset of the plurality of client machines associated with the first subset of the logged-in user accounts to execute the video game in the first match; and
  causing, by the computing system, a second subset of the plurality of client machines associated with the second subset of the logged-in user accounts to execute the video game in the second match.

5. The method of claim 4, wherein the training of the machine learning model comprises:
  accessing, by the computing system, the training data, the training data associated with a sampled set of user accounts registered with the video game service; and
  labeling each user account of the sampled set of user accounts with a label that indicates whether the user account is associated with a player who has cheated while playing at least one video game.

6. The method of claim 4, wherein the training of the machine learning model comprises setting weights for at least one of a set of features derived from the training data or parameters internal to the machine learning model.

7. The method of claim 4, wherein at least some of the training data was generated as a result of players playing one or multiple video games on a platform provided by the video game service.

8. The method of claim 7, wherein the at least some of the training data represents match history data of the players who have played the one or multiple video games in the multiplayer mode by participating in matches.

9. The method of claim 4, further comprising retraining the machine learning model using updated training data to obtain a newly trained machine learning model that is adapted to recent player behaviors.

10. The method of claim 5, wherein:
  the label indicates, for each user account, whether the user account is associated with a player who has been banned from playing, via the video game service, the at least one video game as a consequence of having been determined to have cheated while playing the at least one video game.

11. The method of claim 4, wherein the assigning of the first subset of the logged-in user accounts to the first match and the second subset of the logged-in user accounts to the second match comprises:
  determining that the scores associated with the first subset of the logged-in user accounts are less than a threshold score; and
  determining that the scores associated with the second subset of the logged-in user accounts are equal to or greater than the threshold score.

12. The method of claim 4, wherein the assigning of the first subset of the logged-in user accounts to the first match and the second subset of the logged-in user accounts to the second match is further based on at least one of:
  skill levels of players associated with the logged-in user accounts;
  amounts of time the logged-in user accounts have been waiting to be placed into one of the multiple matches; or
  geographic regions associated with the logged-in user accounts.

13. A system, comprising:
  one or more processors; and
  memory storing computer-executable instructions that, when executed by the one or more processors, cause the system to:
    train a machine learning model using training data to obtain a trained machine learning model;
    determine trust scores for a plurality of user accounts registered with a video game service, wherein the trust scores are determined by:
      identifying a first user account of the plurality of user accounts that is associated with at least one of a professional player or an employee of a service provider of the video game service;
      proactively assigning a predetermined score to the first user account without using the trained machine learning model;
      accessing data associated with an individual user account of the plurality of user accounts other than the first user account;
      providing the data as input to the trained machine learning model; and
      generating, as output from the trained machine learning model, a trust score associated with the individual user account, the trust score relating to a probability of a player associated with the individual user account cheating, or not cheating, while playing one or more video games in a multiplayer mode;
    receive information from a plurality of client machines, the information indicating logged-in user accounts, of the plurality of user accounts, that are logged into a client application executing a video game;
    define multiple matches into which players associated with the logged-in user accounts are to be grouped for playing the video game in the multiplayer mode, the multiple matches comprising at least a first match and a second match;
    assign a first subset of the logged-in user accounts to the first match and a second subset of the logged-in user accounts to the second match based at least in part on the trust scores determined for the logged-in user accounts;
    cause a first subset of the plurality of client machines associated with the first subset of the logged-in user accounts to execute the video game in the first match; and
    cause a second subset of the plurality of client machines associated with the second subset of the logged-in user accounts to execute the video game in the second match.

14. The system of claim 13, wherein the computer-executable instructions, when executed by the one or more processors, further cause the system to, prior to determining the trust scores:
  access the training data, the training data associated with a sampled set of user accounts; and
  label each user account of the sampled set of user accounts with a label that indicates whether the user account is associated with a player who has cheated while playing at least one video game.

15. The system of claim 14, wherein:
  the label indicates, for each user account, whether the user account is associated with a player who has been banned from playing, via the video game service, the at least one video game as a consequence of having been determined to have cheated while playing the at least one video game.

16. The system of claim 13, wherein at least some of the training data was generated as a result of players playing one or multiple video games on a platform provided by the video game service.

17. The system of claim 13, wherein the computer-executable instructions, when executed by the one or more processors, further cause the system to, prior to determining the trust scores, determine that players associated with the plurality of user accounts have accrued a level of experience in an individual play mode.

18. The method of claim 2, wherein each of the labels indicates whether the user account is associated with a player who has been banned from playing, via the video game service, the at least one video game as a consequence of having been determined to have cheated while playing the at least one video game.

19. The method of claim 4, further comprising, prior to the determining of the scores, determining that players associated with the plurality of user accounts have accrued a level of experience in an individual play mode.

20. The method of claim 1, further comprising, prior to the determining of the trust scores, determining that players associated with the plurality of user accounts have accrued a level of experience in an individual play mode.

* * * * *